United States Patent [19]

Moritz

[11] Patent Number: 5,014,506
[45] Date of Patent: May 14, 1991

[54] GUIDE CHAIN FOR GUIDING ENERGY LINES

[75] Inventor: Werner Moritz, Siegen, Fed. Rep. of Germany

[73] Assignee: Kabelschlepp Gesellschaft mit beschränkter Haftung, Siegen, Fed. Rep. of Germany

[21] Appl. No.: 562,635

[22] Filed: Aug. 3, 1990

[30] Foreign Application Priority Data

Aug. 26, 1989 [DE] Fed. Rep. of Germany ....... 3928234

[51] Int. Cl.$^5$ ............................................. F16G 13/16
[52] U.S. Cl. ........................................ 59/78.1; 248/49
[58] Field of Search ................... 59/78.1, 900, 2.78; 248/48, 49, 50, 51, 78

[56] References Cited

U.S. PATENT DOCUMENTS 4,626,233 12/1986 Moritz ................................. 59/78.1
4,833,876 5/1989 Kitao et al. ......................... 59/78.1

FOREIGN PATENT DOCUMENTS 3408912 8/1945 Fed. Rep. of Germany .
2255283 5/1974 Fed. Rep. of Germany .
3709953 10/1988 Fed. Rep. of Germany .
3730586 11/1988 Fed. Rep. of Germany .
635175 11/1978 Switzerland .

Primary Examiner—David Jones
Attorney, Agent, or Firm—Robert W. Becker & Associates

[57] ABSTRACT

A guide or feeder chain for power and supply lines is provided. The chain has a separable strap that comprises at least two crosspieces that are interconnected by separating members that extend transverse to the crosspieces, and also comprises dividers that are disposed parallel to the crosspieces. To increase the variation possibilities for the spacings of the separating members and the arrangement of the dividers, the separating members are provided with openings and plugs or insertion elements are disposed in these openings for the securement of the dividers.

8 Claims, 2 Drawing Sheets

5,014,506

GUIDE CHAIN FOR GUIDING ENERGY LINES

BACKGROUND OF THE INVENTION

The present invention relates to a guide or feeder chain for power and supply lines, and includes, between chain link members, a separable strap that comprises at least two crosspieces that are interconnected by separating members that extend transverse to the crosspieces and are provided with openings, with the strap further comprising dividers that are disposed parallel to the crosspieces.

CH-PS 635 175 discloses a guide or feeder chain that has separating members and transverse members through which cables or the like that are placed therein are held in the neutral zone, i.e. in the middle, even when the chain is turned around. The transverse members are secured to the separating members via recesses or projections.

DE-PS 22 55 283 discloses a separable strap for a guide or feeder chain that includes two crosspieces that have a flattened cross-sectional configuration and a plurality of separating members that at the top and bottom ends have recesses that are provided with undercuts; after the crosspieces have been placed into the recesses, they can be secured with the separating members in a frictional and interlocking manner by twisting the crosspieces about their longitudinal axis. This known separating member has receiving spaces for power and supply lines that are separated from one another in only one direction.

DE-PS 37 09 953 discloses a chain link for guide or feeder chains where the strap comprises two crosspieces, separating members that are disposed transverse to and between these crosspieces, and dividers that are disposed between the separating members parallel to the crosspieces. The connection between the crosspieces and the separating members comprises recesses that are provided in the crosspieces at large intervals and into which the ends of the separating members are placed. The connections between the separating members and the dividers comprise dovetailed guides that are disposed at large intervals and into which the dividers can be inserted during assembly. This connection technique for the crosspieces, separating members, and dividers leads to a rigid grating for accommodating power and supply lines, and cannot later be altered.

DE-PS 34 08 912 discloses a chain link in which the interior can have a variable configuration as a result of separating members that can be shifted. For this purpose, in one strap slots in the form of receiving openings are provided, and in the other strap holes are provided in which the separating plates can be secured by means of plug elements that are formed thereon.

It is an object of the present invention to provide a guide or feeder chain that has a separable strap, whereby the spacings between the separating members and the arrangement of the dividers offers as great a possibility for variation as possible, and whereby it is also possible to undertake this variation at a subsequent period in time.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
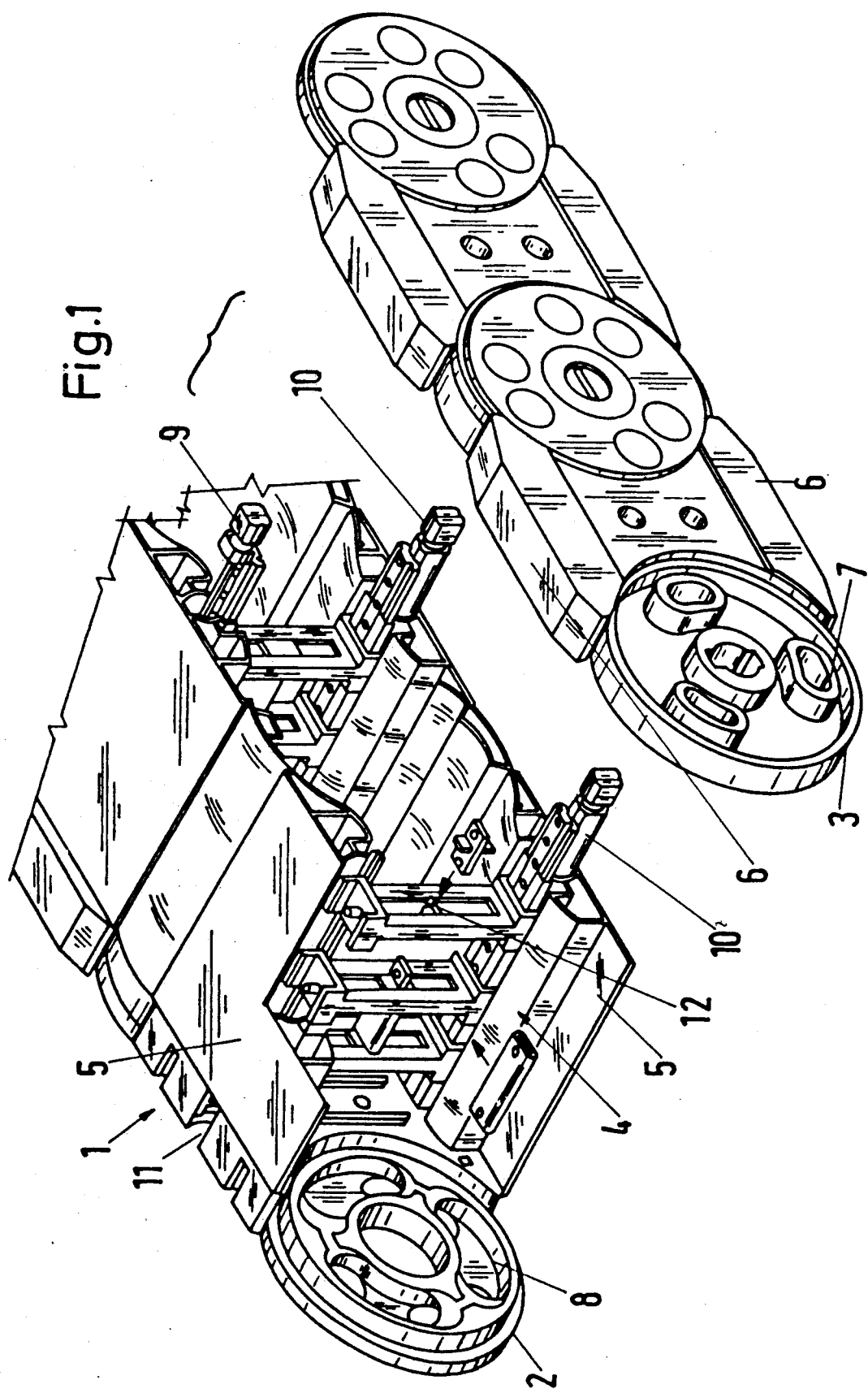
FIG. 1 is a partially exploded view of a portion of one exemplary embodiment of a partially preassembled inventive guide or feeder chain having straps.
Figure 2:
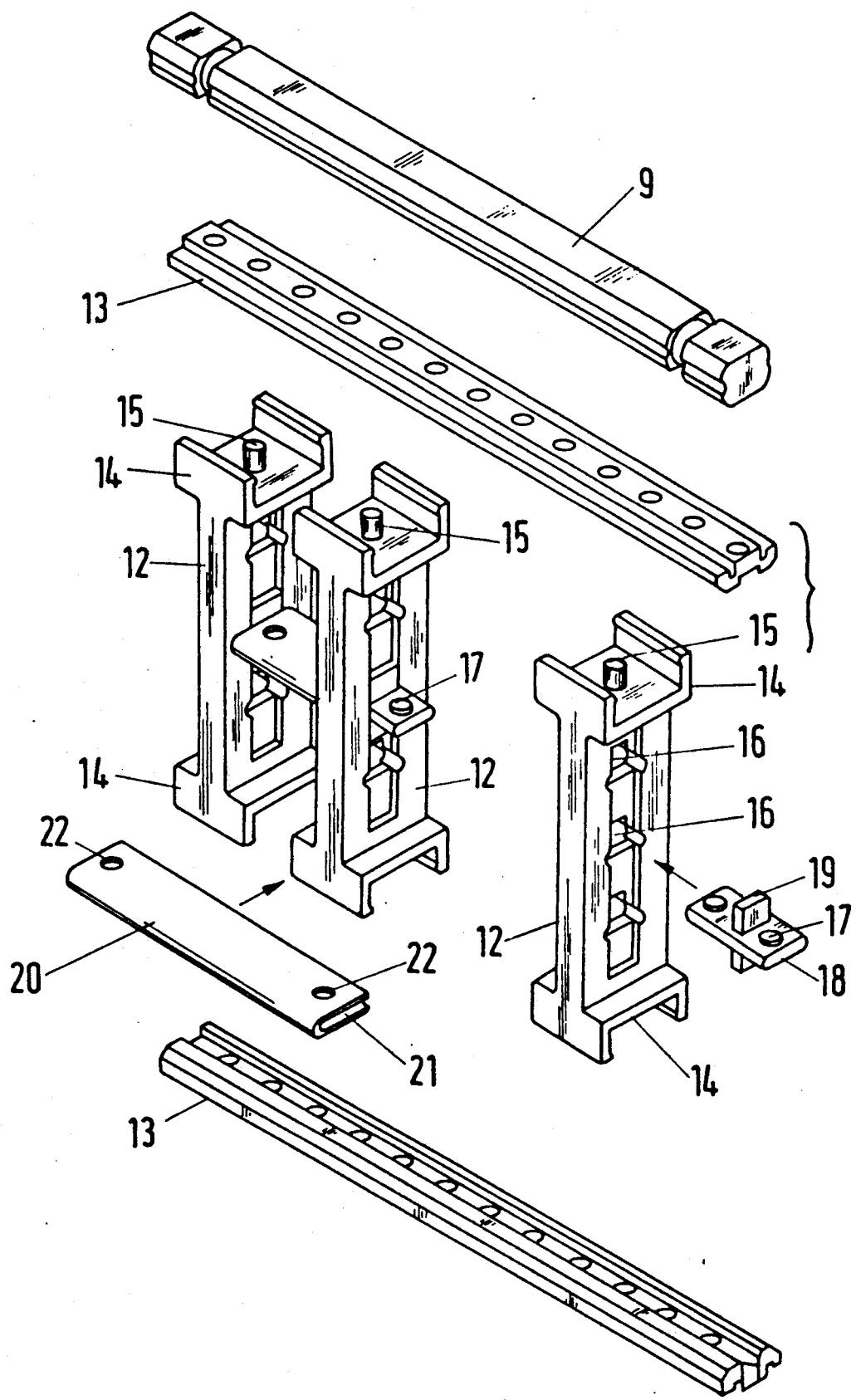
FIG. 2 is an exploded view of one exemplary embodiment of an inventive strap to show the individual structural components thereof.

The guide or feeder chain of the present invention is characterized primarily in that perforated strips are disposed between the crosspieces and the separating members, the brackets of the separating members are provided with pins to engage the perforated strips, and plugs or insertion elements ar disposed in the openings of the separating members for the securement of the dividers.

It has been shown to be expedient to provide the dividers with a flat, C-shaped cross-sectional configuration that on one narrow side is provided with a longitudinal slot and can therefore be placed upon the plugs, with preload, either axially or transversely. To improve the connection between the plugs and the dividers, it is proposed that the ends of the plugs, on both sides, be provided with projections or knobs, and that the dividers be provided with holes that correspond therewith.

The plugs can be provided with a partition or transverse wall via which the plug can rest against the separating members. This technique has the advantage that adjacent dividers can also be disposed at different levels without having to worry that the plugs, which serve for the securement in the separating members, might shift.

In separating members constructed pursuant to the present invention, a plurality of openings are provided at short intervals from one another, so that the dividers can selectively be secured via the plugs both at lesser as well as at greater intervals; this can be done either during a preassembly operation of the strap, or also subsequently after the preassembled strap has already been installed in a chain link of the guide or feeder chain.

A guide or feeder chain constructed pursuant to the present invention has a separating member that has a simple construction, is easy to produce, has variable applications, and can be adapted to respective requirements. Thus, for example, the crosspieces can be cut to the desired length from an appropriately shaped rod of material. The same holds true for the dividers and the perforated strips. The separating members are molded from plastic. With these individual components, the straps can be preassembled for standard sizes of the guide or feeder chain, or can also be assembled at the last moment for special applications. It is even possible to again alter the spacings between the separating members and dividers of a finished assembled guide or feeder chain at a later point in time if it is necessary or desired to do so. In order to alter the spacings of the separating members, it is merely necessary to open one side of the strap by twisting the crosspiece. The dividers can be shifted within the variation width that is prescribed by the number of openings without even having to open this strap.

Further specific features of the present invention will be described in detail subsequently.

DESCRIPTION OF PREFERRED EMBODIMENTS

Referring now to the drawings in detail, the chain link 1 of a guide or feeder chain for power and supply lines comprises two spaced-apart link members 2, 3 that are disposed parallel to one another, a strap 4 disposed therebetween, and in the illustrated embodiment cover members 5 as well as sliding skids 6 that are disposed on the top and bottom. The pivot angle of adjacent chain links relative to one another is limited by abutment cams 7 that are disposed at one end of the link members 2, 3 and that engage in recessed portions 8 at the other end of an adjacent link member 2, 3.

The straps 4 are formed from two crosspieces 9, 10 that have a somewhat flattened cross-sectional configuration. The crosspieces 9, 10 are adapted to be inserted into openings 11 of the link members 2, 3 that are provided with undercuts; by turning the crosspieces 9, 10 by 90°, these crosspieces can be secured in place in the openings 11 in a frictional and interlocking manner. Together with the two link members 2, 3, the two crosspieces 9, 10 from the carrying and supporting construction of a chain link 1.

Disposed between the crosspieces 9, 10 are a plurality of separating members 12, with the spacing between them being fixed by perforated strips 13 that are disposed between the crosspieces 9, 10 and the separating members 12. The top and bottom ends of the separating members 12 are provided with respective U-shaped brackets 14 in which are secured pins 15 for engaging the perforated strips 13.

The shafts of the separating members 12 are provided with a plurality of openings 16 that are disposed one above the other. Plugs or similar insertion elements 18 can be inserted into the openings 16; the ends of the plugs 18 are provided with projections or knobs 17. In the inserted position, partitions or transverse walls 19 of the plugs 18 rest against the shafts of the separating members 12. The openings 16 in the separating members 12 can be smaller than these transverse walls 19 and can be provided with a recess for the knobs 17 of the plugs or insertion elements 18.

Dividers 20 can be secured on the plugs 18. These dividers 20 have a flat C-shaped cross-sectional configuration, and are provided on one narrow side with a longitudinal slot 21. The dividers 20 can be placed upon the plugs 18 either in the axial direction as well as transverse thereto; the dividers 20 extend around the plugs 18 with a slight preload. For this purpose, the distance between the profile legs of a divider 20 is slightly less than the thickness of the plugs 18. Provided at the ends of the dividers 20 are holes 22 that extend over the knobs 17 on the plugs 18.

To assemble a chain link 1, first a perforated strip 13 and a crosspiece 9 or 10 are inserted into an appropriate guide means of a cover member 5. Subsequently, two link members 2, 3 are connected with this assembled component. Thereupon, the separating members 12 are disposed next to one another at the desired spacing. Subsequently, the second perforated strip 13 and the second crosspiece 10 or 9 are inserted into the second cover member 5 and this component is secured in place in the link members 2, 3. Thereupon, the desired number of dividers 20 can be disposed between the separating members 12. For this purpose, the plugs or insertion elements 18 are first inserted into the appropriate openings 16, and the pertaining dividers 20 are then inserted transverse thereto. Removal of the dividers 20 is possible by introducing a screwdriver into the longitudinal slot 21 and slightly opening the cross-sectional area.

The present invention is, of course, in no way restricted to the specific disclosure of the specification and drawings, but also encompasses any modification within the scope of the appended claims.

What I claim is:

1. In a guide chain for energy lines comprising chain link members and having a separable strap between each two of said chain link members, with said strap comprising at least two crosspieces that are interconnected by separating members that extend transverse to said crosspieces and provided with openings, with said strap further comprising dividers that are disposed parallel to said crosspieces, the improvement comprising:
   perforated strips that are respectively disposed between one of said crosspieces and said separating members, with said separating members being provided with brackets that receive said perforated strips and being furthermore provided with pins to engage said perforated strips;
   insertion elements disposed in said openings of said separating members, with said dividers being mounted on said insertion elements;
   each of said dividers having a flat, C-shaped cross-sectional configuration with a longitudinal slot to permit axial as well as transverse placement of said divider on said insertion element.

2. A guide chain for energy lines according to claim 1, in which said dividers are provided with holes, and in which said insertion elements have end portions that are provided with knobs for snapping into said holes of said dividers.

3. A guide chain for energy lines according to claim 2, in which each of said insertion elements is provided with a transverse wall for resting against one of said separating members.

4. A guide chain for energy lines according to claim 3, in which said openings of said separating members are smaller than said transverse walls and are provided with recess means for said knobs of said insertion elements.

5. In a guide chain for energy lines comprising chain link members and having a separable strap between each two of said chain link members, with said strap comprising at least two crosspieces that are interconnected by separating members that extend transverse to said crosspieces and are provided with openings, with said strap further comprising dividers that are disposed parallel to said crosspieces, the improvement comprising:
   insertion elements disposed in said openings of said separating members, with said dividers being mounted on said insertion elements;
   each of said dividers having a flat, C-shaped cross-sectional configuration with a longitudinal slot to permit axial as well as transverse placement of said divider on said insertion element;
   each of said insertion elements being provided with a transverse wall for resting against one of said separating members.

6. A guide chain for energy lines according to claim 5, in which said dividers are provided with holes, and in which said insertion elements have end portions that are provided with knobs for snapping into said holes of said dividers.

7. A guide chain for energy lines according to claim 5, in which said openings of said separating members are smaller than said transverse walls and are provided with recess means for said knobs of said insertion elements.

8. A guide chain for energy lines according to claim 5, in which perforated strips are respectively disposed between one of said crosspieces and said separating members, with said separating members being provided with brackets that receive said perforated strips and being furthermore provided with pins to engage said perforated strips.

* * * * *